June 4, 1940.  N. C. CLARK  2,203,522
WEATHER STRIP AND MOUNTING THEREFOR
Filed Oct. 11, 1937
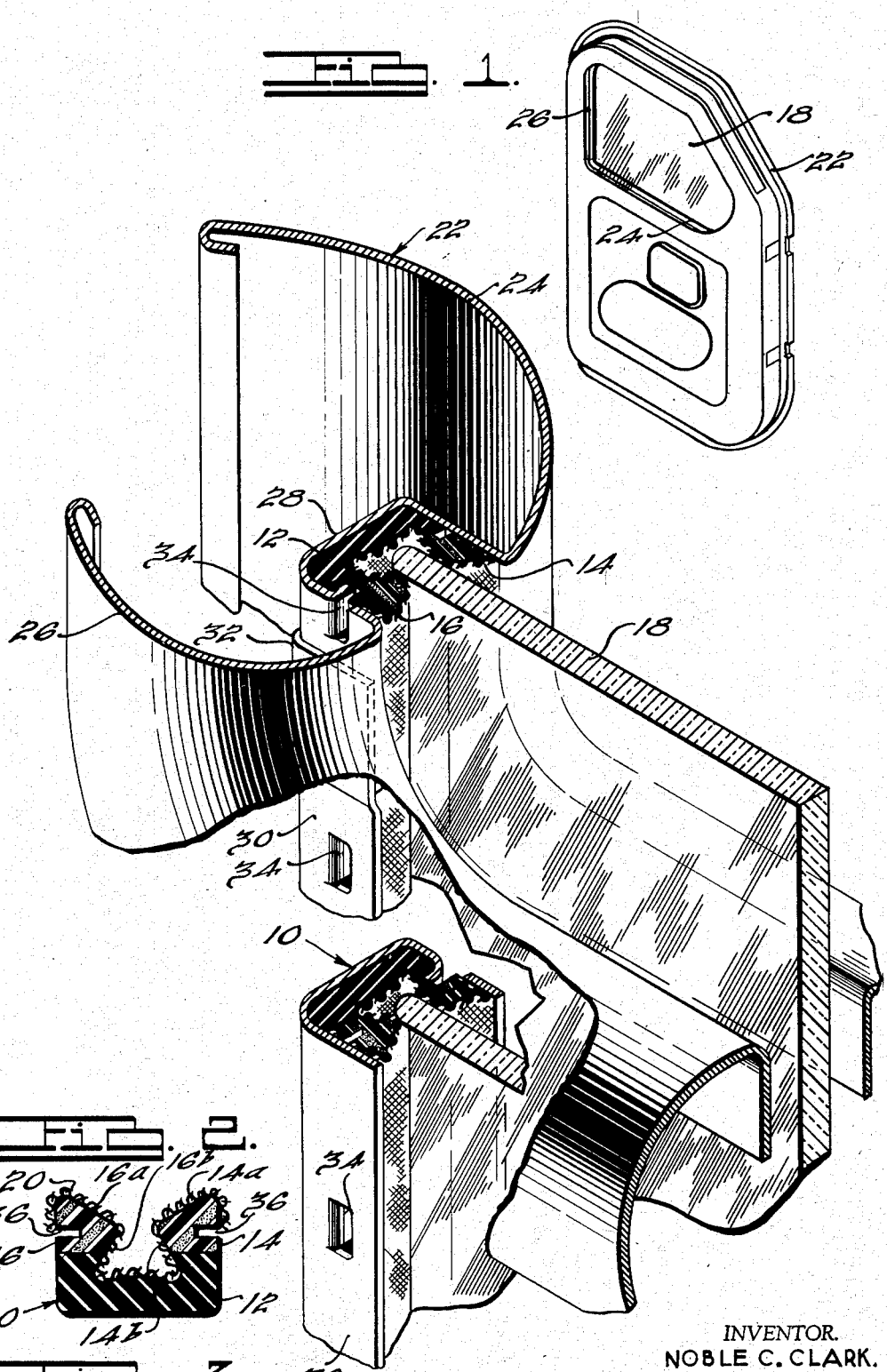
INVENTOR.
NOBLE C. CLARK.
BY
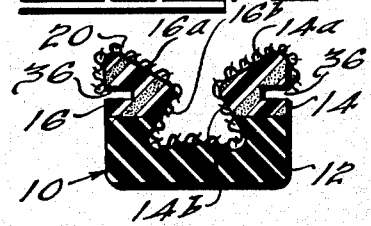
ATTORNEYS.

Patented June 4, 1940

2,203,522

UNITED STATES PATENT OFFICE 2,203,522

WEATHER STRIP AND MOUNTING THEREFOR

Noble C. Clark, Ferndale, Mich., assignor to The Murray Corporation of America, Detroit, Mich., a corporation of Delaware Application October 11, 1937, Serial No. 168,385

1 Claim. (Cl. 296—44.5)

The present invention relates to vehicle body construction, and in particular is directed to the provision of an improved weather strip and mounting therefor in an associated body structure.

Objects of the present invention are to provide an improved sealing or weather strip, particularly adapted for use with the movable windows of an associated vehicle, and characterized as being extremely simple and economical to manufacture as well as being exceedingly efficient and durable in operation; to provide a weather or sealing strip of the just mentioned character, characterized as embodying a reinforced backing portion of relatively stiff rubber or the like and a relatively flexible glass engaging portion; to provide such an element of generally U-shape, the back whereof is formed of relatively stiff but resilient material and the opposed legs whereof are formed of relatively soft resilient material such as sponge rubber; to provide such an element in which the opposed legs are of inwardly presenting tapered form, so as to present restricted areas for engagement by the glass; further objects of the invention are to provide an improved method and means for securing a weather strip of the above indicated character within a glass run or guide of the associated body portion; and to provide such construction in which the weather strip is provided with one or more grooves in the outer surfaces, adapted to receive inwardly struck tongues formed in the associated glass guides or runs.

With the above as well as other objects in view, which appear in the following description and in the appended claim, a preferred but illustrative embodiment of the invention is shown in the accompanying drawing, in which:

Figure 1 is a view in perspective of a vehicle door in which the invention may be embodied;

Fig. 2 is a fragmentary view in perspective, showing details of the invention; and, Fig. 3 is a view in horizontal section of the improved weather strip.

It will be appreciated from a complete understanding of the invention that the improvements thereof may be embodied in widely differing forms, and may be utilized in connection with widely differing vehicle body constructions. Preferably, however, and as illustrated the present improvements are embodied in vehicle door constructions of the general character described and claimed in the co-pending application of Widman, Serial No. 162,449, filed September 4, 1937, which is assigned to the assignee of the present application. For the purposes of the present description, the co-pending constructions may be characterized as utilizing window opening defining members which are separately preformed to define laterally spaced garnish mold and reveal portions, as well as a channel-shaped glass run or guide interposed between the just mentioned two portions. The glass run or guide form in the window defining member, which may be suitably connected to the body portion of the door, is connected to and forms a continuation of the usual glass runs or guides positioned within the body portion of the door. The improvements of the present invention are primarily concerned with the specific construction of the weather strip as well as its method of connection to the door glass run or guide.

Referring to the drawing, the improved weather strip is designated as a whole as 10, and comprises a generally U-shaped backing portion 12 and oppositely arranged glass engaging portions 14 and 16. The U-shaped backing portion is preferably formed of a resilient but relatively rigid material such as rubber of suitable composition, and the glass engaging portions 14 and 16 are preferably formed of a relatively soft material such as sponge rubber, thus adapting them to have a close and continuous sealing engagement with the glass 18 forming the window. The portion 12 may be secured to the portions 14 and 16 in any suitable way, although a cementing operation which forms a permanent bond between the member is preferred.

It will be noted that the sides 14a and 16a of the portions 14 and 16 are divergent, and that the sides 14b and 16b as well as the adjacent surfaces of the reinforcing member 12 of which they form a continuation, are correspondingly divergent. The sides 16a and 16b and 14a and 14b thus come together at a point which constitutes the point of engagement between the glass 18 and the portions 14 and 16.

Many advantages result from the just described inwardly presenting tapered construction of the members 14 and 16. For example, the tapered form serves to confine the engagement between the glass and the portions 14 and 16 to areas of relatively small width adjacent the points thereof. The pointed portions of the members 14 and 16 are preferably disposed to have a free spacing between them which is less than the thickness of the glass. Thus, when the glass is interposed between them, both members 14 and 16 are slightly compressed in the regions of these points thereof. This compression of the relatively soft portions 14 and 16 insures sealing contact with the glass and at the same time reduces the friction between the glass and the portions 14 and 16 to a minimum.

A further advantage, resulting primarily from the divergent character of the surfaces 14a and 16a, is that these surfaces act as a guide for the glass as the latter is moved into the weather strip, which movement occurs when the window is raised to a fully closed position from a partially lowered position.

It is preferred to apply a surfacing material 20, which may be felt, plush or the like to the inner surfaces of the weather strip 10, for the purpose of improving the appearance thereof as well as for the purpose of reducing the friction between the glass 18 and the weather strip 10 to a minimum.

The improved arrangement for securing the weather strip 10 within the glass runs or guides and the associated door is most clearly shown in Fig. 2, in which the formed window opening 22 includes an outer reveal portion 24, an inner or garnish mold portion 26 and an intermediate channel-shaped glass run or guide 28. It will be appreciated that the sides of the channel-shaped guide 28 extend continuously around the entire window opening, and that the base thereof is continuous around the sides and top of the window but is interrupted at the base of the window opening so as to accommodate the movement of the glass. Adjacent the base of the window at each side thereof, the glass guide 28 is secured to and forms a continuation of the usual glass guides such as 30 which are positioned within the body portion of the door at respectively opposite sides thereof. As shown, the upper end of each glass guide 30 is enlarged at 32 so as to overlap the adjacent glass guide 28.

In accordance with the present invention, the glass guides 28 and 30 are each provided with a series of inwardly struck tongues 34 which project inwardly from the sides thereof. The tongues 34 in the respective sides may be arranged in opposite relation to each other; or, alternately, may be arranged in staggered relation.

The weather strip 10 is preferably provided at each side thereof with a continuously extending slot 36, the depth and width whereof preferably corresponds to the length and thickness of the tongues 34. Broadly, the slots may be formed either in the member 12 or in the portions 14 and 16. Preferably, however, and as shown, they are formed in the portions 14 and 16. With this relation it will be appreciated that the weather strip 10 may be drawn into the glass guides 28 and 30 in endwise relation, with the tongues 34 positioned within the slots 36. The mating relation between the tongues and slots readily permits the drawing of the strip into the guides but at the same time effectively prevents the strip from being moved laterally from the guide.

It will be seen from the foregoing that the present invention provides an extremely simple and effective arrangement for inserting a weather strip into the glass run guides of an associated body and for retaining the same in place therein. Moreover, the invention provides an extremely simple and effective form of weather strip, characterized in that it insures a continuous sealing engagement between the glass and the weather strip while at the same time minimizing the friction between these parts. The provision of the reinforcing backing for the weather strip is found in practice to prolong its life as well as to assist in retaining the weather strip in place.

Although only a specific embodiment of the invention has been described in detail, it will be appreciated that various modifications in the form, number and arrangement of parts may be made within the spirit and scope thereof.

What is claimed is:

A sealing strip forming a glass run guide in a metal channel in which inwardly presented tongues are struck from the wall thereof at spaced points, said strip including a base member of channel formation, projections on the flanges of said base member of more resilient and yieldable material than that of said base member, the outer faces of said projections being provided with longitudinal slots in which the tongues of said metal channel project.

NOBLE C. CLARK.